US010267216B2

United States Patent
Oyagi et al.

(10) Patent No.: US 10,267,216 B2
(45) Date of Patent: Apr. 23, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Hiroshi Oyagi, Gotenba (JP); Yusuke Takasu, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 331 days.

(21) Appl. No.: 15/164,237

(22) Filed: May 25, 2016

(65) Prior Publication Data

US 2016/0348578 A1 Dec. 1, 2016

(30) Foreign Application Priority Data

Jun. 1, 2015 (JP) ................................. 2015-111551

(51) Int. Cl.
| | |
|---|---|
| *F02B 33/44* | (2006.01) |
| *F02B 39/16* | (2006.01) |
| *F02B 33/40* | (2006.01) |
| *F02B 39/10* | (2006.01) |
| *F02B 37/04* | (2006.01) |

(Continued)

(52) U.S. Cl.
CPC .............. *F02B 39/16* (2013.01); *F02B 33/40* (2013.01); *F02B 37/04* (2013.01); *F02B 37/14* (2013.01); *F02B 39/10* (2013.01); *F02D 41/0007* (2013.01); *F02D 41/10* (2013.01); *F02D 2200/0406* (2013.01); *Y02T 10/144* (2013.01)

(58) Field of Classification Search
CPC .... F02B 37/001; F02B 37/004; F02B 37/007; F02B 37/013; F02B 39/16
USPC ......................................................... 60/608
See application file for complete search history.

(56) References Cited

U.S. PATENT DOCUMENTS 6,062,026 A * 5/2000 Woollenweber ........ F02B 37/04
60/605.2
6,079,211 A * 6/2000 Woollenweber ...... F02B 37/025
60/602

(Continued)

FOREIGN PATENT DOCUMENTS

| JP | 2004-169629 A | 6/2004 |
|---|---|---|
| JP | 2006-097565 A | 4/2006 |

(Continued)

*Primary Examiner* — Ngoc T Nguyen
(74) *Attorney, Agent, or Firm* — Hunton Andrews Kurth LLP

(57) ABSTRACT

A turbocharger that includes a turbine and a compressor, an electric supercharger that is arranged in an intake passage, and a control device that increases a rotational speed of the electric supercharger upon receipt of a torque increase request with respect to the internal combustion engine are provided. During a process in which the rotational speed of the electric supercharger is increasing, if the rotational speed arrives at a predetermined switching rotational speed "Ntec", the control device decreases a rate of increase in the rotational speed from a first rate of increase "Nteup1" to a second rate of increase "Nteup2" (<Nteup1). At such time, the control device sets each of "Ntec" and "Nteup2" based on at least any one of an engine speed, a rate of increase in the engine speed, and a supercharging pressure difference between a target supercharging pressure and an actual supercharging pressure.

8 Claims, 9 Drawing Sheets

(51) Int. Cl.
  *F02B 37/14*   (2006.01)
  *F02D 41/00*   (2006.01)
  *F02D 41/10*   (2006.01)

(56) References Cited

U.S. PATENT DOCUMENTS

| | | | |
|---|---|---|---|
| 2004/0093867 | A1 | 5/2004 | Masuda |
| 2006/0066287 | A1 | 3/2006 | Obayashi et al. |
| 2007/0051349 | A1 | 3/2007 | Marumoto et al. |
| 2007/0234985 | A1* | 10/2007 | Kolmanovsky ............ F01L 9/04 123/90.15 |
| 2015/0176481 | A1* | 6/2015 | Jaeger ..................... F01N 5/04 60/608 |

FOREIGN PATENT DOCUMENTS

| | | |
|---|---|---|
| JP | 2007-071138 A | 3/2007 |
| JP | 4811290 B2 | 11/2011 |

\* cited by examiner

CONTROL DEVICE FOR INTERNAL COMBUSTION ENGINE

CROSS-REFERENCE TO RELATED APPLICATION

The present application claims priority to Japanese Patent Application No. 2015-111551 filed on Jun. 1, 2015, which is incorporated herein by reference in its entirety.

TECHNICAL FIELD

The present invention relates to a control device for an internal combustion engine, and more particularly to a control device for an internal combustion engine that is equipped with an electric supercharger.

BACKGROUND

Technology relating to supercharging assistance using an electric motor has already been disclosed in, for example, Japanese Patent Laid-Open No. 2004-169629. According to the aforementioned technology, a maximum amount of current that is fed to an electric motor during an initial stage of feeding current thereto is determined as a supply current amount. By this means, the response with respect to a buildup in a supercharging pressure is improved.

Following is a list of patent literatures which the applicant has noticed as related arts of the present invention.
[Patent Literature 1]
  Japanese Patent Laid-Open No. 2004-169629
[Patent Literature 2]
  Japanese Patent Laid-Open No. 2006-97565
[Patent Literature 3]
  Japanese Patent No. 4811290
[Patent Literature 4]
  Japanese Patent Laid-Open No. 2007-71138

SUMMARY

However, a large amount of electric power is consumed in order to drive an electric supercharger. Particularly, a large amount of electric power is consumed when increasing the rotational speed of an electric supercharger. Therefore, depending on the capability of an electric power storage apparatus, there is a risk that it will be difficult to ensure a stable electric power supply due to a drop in electric power that occurs when the rotational speed increases. Although it is desirable to suppress electric power consumption as a countermeasure to the above problem, there is a risk that the supercharging response will decrease if the electric power consumption is simply lowered. Thus, according to the conventional technology, it is difficult to both suppress the electric power consumption of an electric supercharger and also increase the supercharging response in a compatible manner.

The present invention has been made to solve the above-described problem, and an object of the present invention is to provide a control device for an internal combustion engine that, in an internal combustion engine that is equipped with an electric supercharger, can achieve both suppress electric power consumption and increase a supercharging response in a compatible manner.

In accomplishing the above object, according to a first aspect of the present invention, there is provided a control device for an internal combustion engine that controls an internal combustion engine comprising a turbocharger having a turbine that is arranged in an exhaust passage and a compressor that is arranged in an intake passage, and an electric supercharger that is provided in the intake passage, the control device causing a rotational speed of the electric supercharger to increase at a first rate of increase upon receipt of a torque increase request with respect to the internal combustion engine, wherein:

the control device is configured so that, during a process in which a rotational speed of the electric supercharger is increasing, if the rotational speed arrives at a predetermined switching rotational speed, the control device changes a rate of increase in the rotational speed from the first rate of increase to a second rate of increase that is less than the first rate of increase; and the control device is configured to set the switching rotational speed based on at least any one of an engine speed of the internal combustion engine, a rate of increase in the engine speed, and a supercharging pressure difference between a target supercharging pressure and an actual supercharging pressure, and to also set the second rate of increase based on at least any one of the engine speed of the internal combustion engine, the rate of increase in the engine speed, and a supercharging pressure difference between a target supercharging pressure and an actual supercharging pressure.

According to a second aspect of the present invention, there is provided the control device for an internal combustion engine according to the first aspect, wherein the control device is configured to set the switching rotational speed to a larger value as the engine speed increases.

According to a third aspect of the present invention, there is provided the control device for an internal combustion engine according to the first aspect, wherein the control device is configured to set the second rate of increase to a larger value as the engine speed increases.

According to a fourth aspect of the present invention, there is provided the control device for an internal combustion engine according to the first aspect, wherein the control device is configured to set the switching rotational speed to a larger value as the rate of increase in the engine speed increases.

According to a fifth aspect of the present invention, there is provided the control device for an internal combustion engine according to the first aspect, wherein the control device is configured to set the second rate of increase to a larger value as the rate of increase in the engine speed increases.

According to a sixth aspect of the present invention, there is provided the control device for an internal combustion engine according to the first aspect, wherein the control device is configured to set the switching rotational speed to a larger value as the supercharging pressure difference increases.

According to a seventh aspect of the present invention, there is provided the control device for an internal combustion engine according to the first aspect, wherein the control device is configured to set the second rate of increase to a larger value as the supercharging pressure difference increases.

According to an eighth aspect of the present invention, there is provided the control device for an internal combustion engine according to the first aspect, comprising:

a voltage measurement apparatus that measures a voltage of an electric power storage apparatus of the internal combustion engine;

wherein the control device is configured to calculate a voltage drop rate during a process in which a rotational speed of the electric supercharger is increasing, by using a voltage value that is measured by the voltage measurement apparatus, and to set the switching rotational speed and the second rate of increase so that a future voltage that is estimated based on the voltage drop rate does not become less than a predetermined minimum voltage.

According to the first invention, in a case where the rotational speed of an electric supercharger arrives at a predetermined switching rotational speed during the course of the rotational speed of the electric supercharger increasing, a rate of increase in the rotational speed is controlled so as to change from a first rate of increase to a second rate of increase that is less than the first rate of increase. At such time, the switching rotational speed and the second rate of increase are each set based on at least any one of the engine speed, a rate of change in the engine speed, and a supercharging pressure difference between a target supercharging pressure and an actual supercharging pressure. The larger that the rate of increase in the rotational speed of the electric supercharger is, the more that the electric power consumption amount will increase. On the other hand, as the rotational speed of the compressor of the turbocharger increases, an effect of increasing the supercharging pressure that is produced by the rotational speed of the electric supercharger increasing becomes limited. In addition, the amount of assistance required from the electric supercharger changes depending on the engine speed, a rate of change in the engine speed, and a supercharging pressure difference. According to the present invention, by using at least any one of the engine speed, the rate of change in the engine speed, and the supercharging pressure difference, the switching rotational speed and the second rate of increase are set in accordance with the amount of assistance that is required from the electric supercharger, and it is thereby possible to both suppress electric power consumption and improve the supercharging response in a compatible manner.

According to the second invention, the higher that the engine speed is, the greater the value that the switching rotational speed is set to. The amount of assistance required from the electric supercharger increases as the engine speed increases. Therefore, according to the present invention, because the duration of the first rate of increase is lengthened as the engine speed increases, assistance by the electric supercharger can be effectively increased.

According to the third invention, the higher that the engine speed is, the greater the value that the second rate of increase is set to. The amount of assistance required from the electric supercharger increases as the engine speed increases. Therefore, according to the present invention, assistance by the electric supercharger after the electric supercharger arrives at the switching rotational speed can be effectively increased.

According to the fourth invention, the greater that the rate of increase in the engine speed is, the greater the value that the switching rotational speed is set to. The amount of assistance required from the electric supercharger increases as the rate of change in the engine speed increases. Therefore, according to the present invention, because the duration of the first rate of increase is lengthened as the engine speed increases, assistance by the electric supercharger can be effectively increased.

According to the fifth invention, the greater that the rate of increase in the engine speed is, the greater the value that the second rate of increase is set to. The amount of assistance required from the electric supercharger increases as the rate of change in the engine speed increases. Therefore, according to the present invention, assistance by the electric supercharger after the electric supercharger arrives at the switching rotational speed can be effectively increased.

According to the sixth invention, the greater that the supercharging pressure difference is, the greater the value that the switching rotational speed is set to. The amount of assistance required from the electric supercharger increases as the supercharging pressure difference increases. Therefore, according to the present invention, because the duration of the first rate of increase is lengthened as the supercharging pressure difference increases, the rotational speed of the electric supercharger can be rapidly raised to a high rotational speed and the amount of assistance can be effectively increased.

According to the seventh invention, the greater that the supercharging pressure difference is, the greater the value that the switching rotational speed is set to. The amount of assistance required from the electric supercharger increases as the supercharging pressure difference increases. Therefore, according to the present invention, assistance by the electric supercharger after the electric supercharger arrives at the switching rotational speed can be effectively increased.

According to the eighth invention, during the course of the rotational speed of the electric supercharger increasing, the switching rotational speed and the second rate of increase are set so that a future voltage that is estimated based on a voltage drop rate of an electric power storage apparatus does not become less than a predetermined minimum voltage. Therefore, according to the present invention, even in a case where aged deterioration in an electric power storage apparatus or a cable or the like occurs, a required minimum voltage can be ensured during the course of the rotational speed of the electric supercharger increasing.

DETAILED DESCRIPTION

Embodiments of the present invention are described hereunder with reference to the accompanying drawings. However, it is to be understood that even when the number, quantity, amount, range or other numerical attribute of an element is mentioned in the following description of the embodiments, the present invention is not limited to the mentioned numerical attribute unless it is expressly stated or theoretically defined. Further, structures or steps or the like described in conjunction with the following embodiments are not necessarily essential to the present invention unless expressly stated or theoretically defined.

First Embodiment
[Configuration of First Embodiment]

Figure 1:
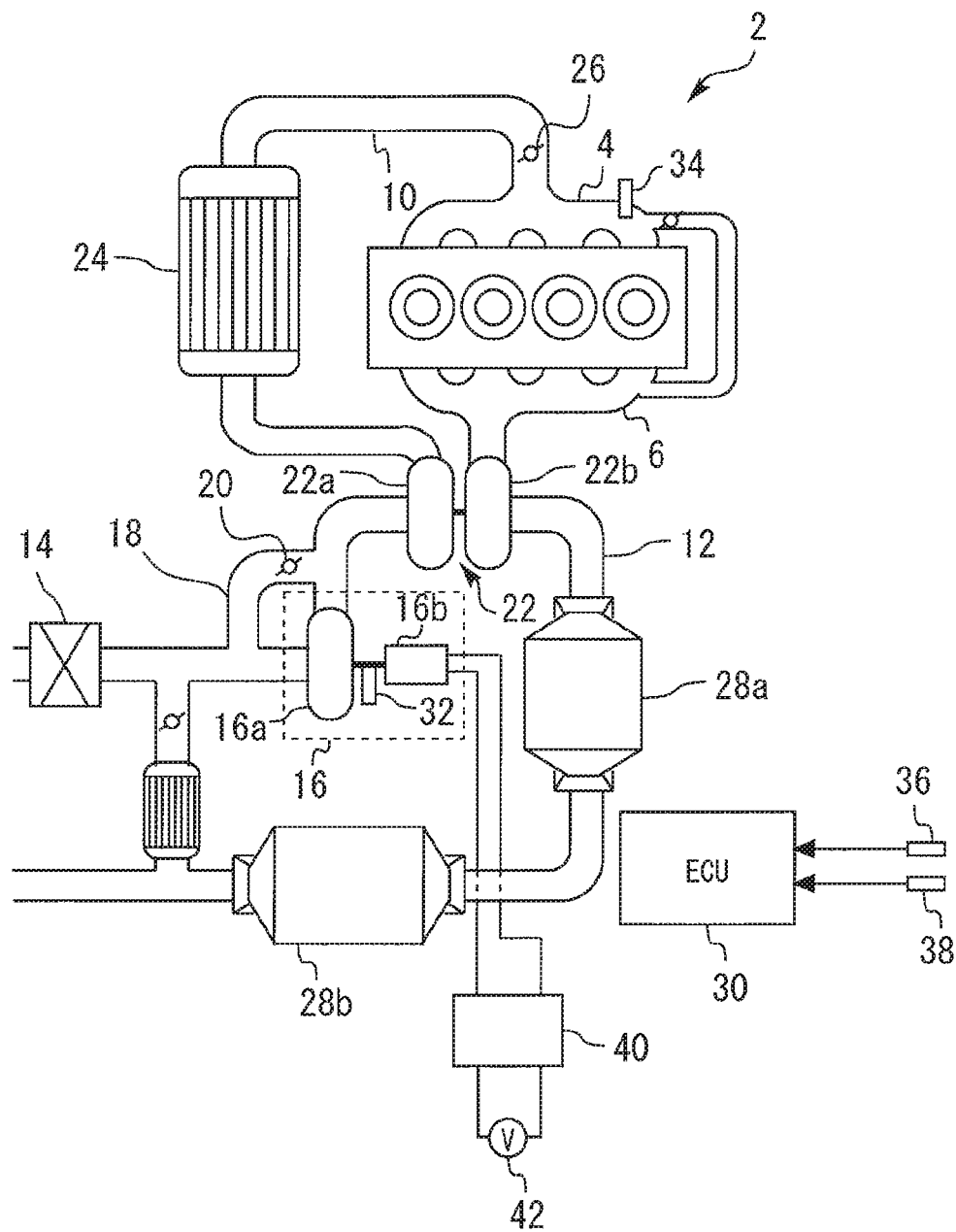
FIG. 1 is a view illustrating the configuration of an engine system to which a control device of a first embodiment of the present invention is applied.

FIG. 1 is a view illustrating the configuration of an engine system to which a control device of a first embodiment of the present invention is applied. An internal combustion engine according to the present embodiment is a diesel engine with a turbocharger (hereunder, referred to simply as "engine"). An intake manifold 4 and an exhaust manifold 6 are installed in an engine main body 2. An intake passage 10 through which fresh air that is drawn in from the atmosphere flows is connected to the intake manifold 4. An exhaust passage 12 for discharging exhaust gas from the engine main body 2 into the atmosphere is connected to the exhaust manifold 6.

An air cleaner 14 is provided at an inlet of the intake passage 10. A compressor 16a (hereunder, referred to as "electric compressor 16a") of an electric supercharger 16 is disposed in the intake passage 10 on an intake-air downstream side relative to the air cleaner 14. The electric compressor 16a is driven by an electric motor 16b. Electric power from an electric power storage apparatus 40 is supplied to the electric motor 16b. An intake bypass passage 18 that bypasses the electric compressor 16a is connected to the intake passage 10. An intake bypass valve 20 that opens and closes the intake bypass passage 18 is disposed in the intake bypass passage 18. The intake bypass valve 20 is closed when the electric compressor 16a is driven.

A compressor 22a (hereunder, referred to as "turbo-compressor 22a") of a turbocharger 22 for supercharging intake air is disposed in the intake passage 10 at a position on an intake-air downstream side relative to the electric compressor 16a. The turbocharger 22 includes a turbine 22b that is arranged in the exhaust passage 12. The turbo-compressor 22a is integrally connected to the turbine 22b through a connecting shaft, and is driven by exhaust gas that flows into the turbine 22b. A variable nozzle vane (not illustrated in the drawing) that changes a channel area for exhaust gas is provided in the turbine 22b. The flow rate of exhaust gas flowing to the turbine 22b can be adjusted to thereby adjust the driving force of the turbo-compressor 22a by changing the degree of opening of the variable nozzle vane.

An intercooler 24 for cooling intake air that is compressed by the turbo-compressor 22a or by both the turbo-compressor 22a and the electric compressor 16a is arranged in the intake passage 10 at a position on the downstream side relative to the turbo-compressor 22a. An electronically controlled throttle 26 that opens and closes the intake passage 10 is disposed in the intake passage 10 on the downstream side relative to the intercooler 24. Intake air that passes through the throttle 26 is distributed to each cylinder through the intake manifold 4.

Exhaust gas from the respective cylinders is collected by the exhaust manifold 6 of the exhaust passage 12, and sent to the turbine 22b. Catalyst devices 28a and 28b for purifying exhaust gas are provided downstream of the turbine 22b in the exhaust passage 12.

The engine system according to the present embodiment includes an ECU (electronic control unit) 30. The ECU 30 is a control device that performs overall control of the entire engine system, and the control device according to the present invention is realized as one function of the ECU 30.

The ECU 30 takes in signals of sensors that are included in the engine system and processes the signals. The sensors are installed at various locations in the engine system. In the electric supercharger 16, a rotational speed sensor 32 is installed that detects a rotational speed "Nte" of the electric compressor 16a. In the intake manifold 4, a pressure sensor 34 is installed for measuring a pressure "pim" (hereunder, referred to as "supercharging pressure") of air compressed by the turbo-compressor 22a or by both the turbo-compressor 22a and the electric compressor 16a. In addition, a speed sensor 36 that detects an engine speed "Ne", an accelerator degree of opening sensor 38 that outputs a signal "accp" that is in accordance with a degree of opening of an accelerator pedal, and a voltmeter 42 for measuring a voltage value of the electric power storage apparatus 40 are the like are also installed. The ECU 30 processes the signals of the various sensors that are taken in, and actuates various actuators in accordance with a predetermined control program. The actuators actuated by the ECU 30 include the electric supercharger 16, the intake bypass valve 20, the throttle 26 and injectors (not illustrated in the drawings). Note that the actuators and sensors connected to the ECU 30 also include a large number of actuators and sensors that are not illustrated in the drawings, and a description of such actuators and sensors is omitted from the present description.

[Operations in First Embodiment]

Supercharging pressure control is included in engine control that is executed by the ECU 30. In the supercharging pressure control of the present embodiment, a degree of opening of the variable nozzle vane provided in the turbine 22b is determined so that an actual supercharging pressure that is measured by the pressure sensor 34 becomes a target supercharging pressure. Further, in the supercharging pressure control of the present embodiment, electric supercharging assistance control is performed by the electric compressor 16a of the electric supercharger 16 for the purpose of suppressing turbo lag at an initial stage of supercharging. According to the electric supercharging assistance control, more specifically, if an accelerator degree of opening "accp" is greater than a predetermined degree of opening and a supercharging pressure difference "Δpim" between the actual supercharging pressure and the target supercharging pressure is greater than a predetermined value, electric current is passed to the electric motor 16b in a state in which the intake bypass valve 20 is fully closed. As a result, intake air that is introduced into the intake passage 10 is supercharged in turn by the electric compressor 16a and the turbo-compressor 22a and thereafter supplied to combustion chambers of the respective cylinders.

Figure 2A:
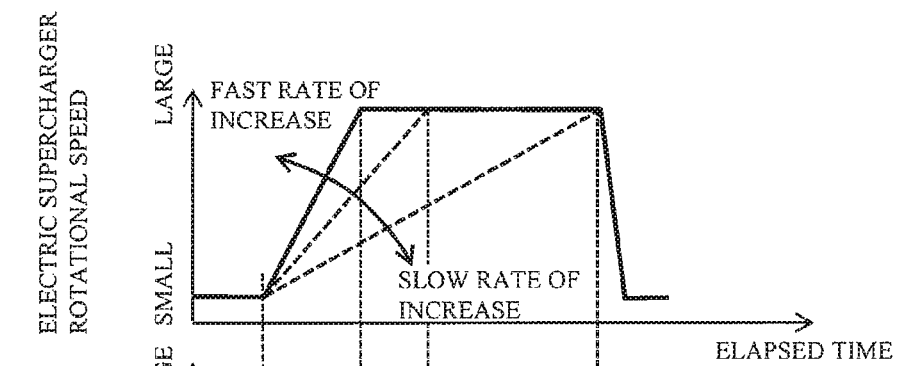
FIG. 2(A) to FIG. 2(E) are time charts illustrating changes in various state quantities during execution of electric supercharging assistance.
Figure 2B:
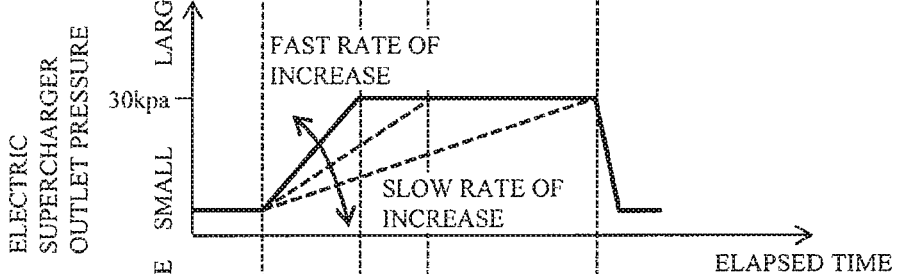
Figure 2C:
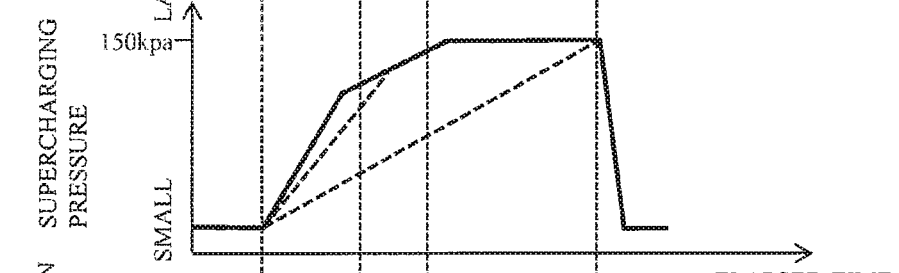
Figure 2D:
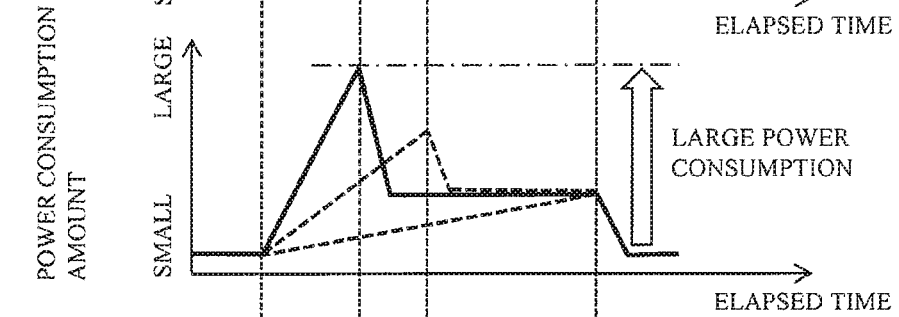
Figure 2E:
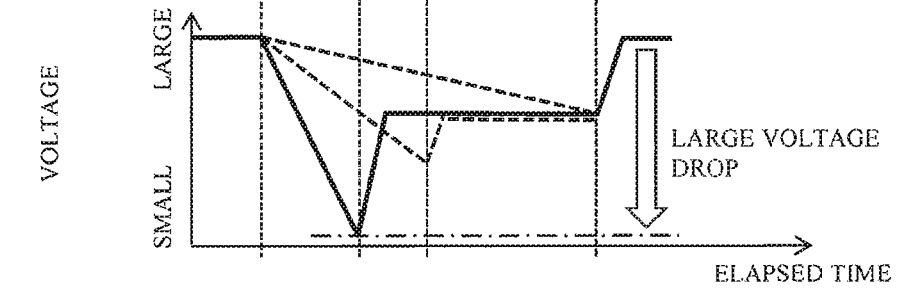

In this case, in a period in which the rotational speed of the electric compressor 16a of the electric supercharger 16 is increasing, the amount of electric power consumption increases with the passage of time. FIG. 2(A) to FIG. 2(E) are time charts illustrating changes in various state quantities during execution of the electric supercharging assistance control. Note that, FIG. 2(A) shows changes over time in the rotational speed of the electric compressor, FIG. 2(B) shows changes over time in an outlet pressure of the electric supercharger, FIG. 2(C) shows changes over time in the supercharging pressure, FIG. 2(D) shows changes over time in the amount of electric power consumption, and FIG. 2(E) shows changes over time in the voltage of the electric power storage apparatus. As shown in FIG. 2(A) to FIG. 2(E), in a period in which the rotational speed of the electric supercharger 16 is increasing, the amount of electric power consumption increases with time, and as a result a voltage drop occurs at the electric power storage apparatus 40. In particular, the higher the rate of increase in the rotational speed of the electric compressor 16a is, the higher the rate of increase in the amount of electric power consumption becomes. Therefore, if the voltage of the electric power storage apparatus 40 decreases to a value that is less than a lower limit due to an increase in the amount of electric power consumption, there is a risk that a malfunction will occur in the operations of electrically powered equipment such as the electric compressor 16a.

Further, the outlet pressure of the electric supercharger 16 is directly influenced by supercharging by the electric compressor 16a. Therefore, as shown in FIG. 2(A) and FIG. 2(B), in a case where, for example, the rotational speed of the electric compressor 16a is increasing at a constant rate of increase, the outlet pressure of the electric supercharger 16 also increases at a constant rate of increase during that period.

In this respect, the supercharging pressure is also influenced by supercharging by the turbo-compressor 22a in addition being influenced by supercharging by the electric compressor 16a. That is, when electric supercharging assistance is executed, the outlet pressure of the electric supercharger 16 (that is, the inlet pressure of the turbo-compressor 22a) is immediately increased by the electric compressor 16a that exhibits good response characteristics. By this means, since the intake air amount that flows to the turbo-compressor 22a increases, as shown in FIG. 2(C), the rate of increase in the supercharging pressure in the initial stage of supercharging is raised. However, although the supercharging response of the electric compressor 16a is excellent, the supercharging capacity thereof is much less than that of the turbo-compressor 22a. Consequently, if the rotational speed of the turbo-compressor 22a increases and the supercharging pressure increases, the effect on increasing the supercharging pressure that is produced by an increase in the rotational speed of the electric compressor 16a will be limited. Note that, if the supercharging pressure approaches the target supercharging pressure in an abrupt manner, the degree of opening of the variable nozzle vane is increased to suppress the occurrence of overshooting. In the example shown in FIG. 2(C), because the supercharging pressure sharply increases as the result of electric supercharging assistance, the degree of opening of the variable nozzle vane is increased during the course of the supercharging pressure increasing, and thereafter the rate of increase in the supercharging pressure decreases.

Thus, although an increase in the rotational speed of the electric compressor 16a significantly contributes to increasing the supercharging pressure during the initial stage of supercharging when the rotational speed of the turbo-compressor 22a is low, the effect thereof becomes limited as the rotational speed of the turbo-compressor 22a increases and the supercharging pressure approaches the target supercharging pressure. In particular, because an increase in the supercharging pressure is limited when the degree of opening of the variable nozzle vane is increased to a large degree of opening, a supercharging effect that is produced by increasing the rotational speed of the electric compressor 16a is further limited.

On the other hand, the amount of electric power consumption continues to increase in accordance with the rate of increase in the rotational speed of the electric compressor 16a. Therefore, if the operating period is one in which the effect of electric supercharging assistance is limited, even if the rate of increase in the rotational speed of the electric compressor 16a is lowered to some extent, the influence thereof with respect to an increase in the supercharging pressure will be small, and rather in such a period it is preferable to actively lower the rate of increase in the rotational speed to suppress electric power consumption.

Figure 3:
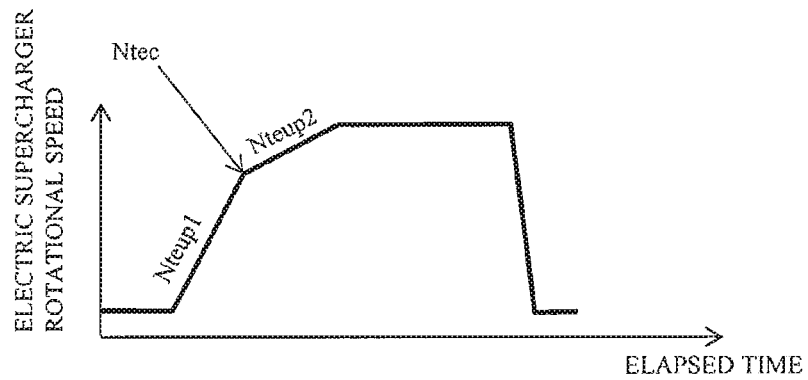
FIG. 3 is a view illustrating changes over time in a rotational speed of an electric compressor during execution of electric supercharging assistance.

Therefore, in the engine system of the present embodiment, control is performed so that, during execution of electric supercharging assistance by the electric supercharger 16, the rate of increase in the rotational speed of the electric compressor 16a is lowered at a time point that is partway through the process of executing the electric supercharging assistance. FIG. 3 is a view illustrating changes over time in the rotational speed of the electric compressor during execution of electric supercharging assistance control. As shown in FIG. 3, with respect to the rotational speed of the electric compressor 16a during execution of electric supercharging assistance, first the rotational speed rate of increase is set to a predetermined first rate of increase "Nteup1", and thereafter from a time point at which the rotational speed "Nte" of the electric compressor 16a arrives at a predetermined switching rotational speed "Ntec", the rotational speed rate of increase is set to a predetermined second rate of increase "Nteup2" that is less than the first rate of increase "Nteup1".

Note that, preferably the first rate of increase "Nteup1" in the rotational speed is set to as large a rate of increase as possible in order to suppress the occurrence of turbo lag. Further, the second rate of increase "Nteup2" in the rotational speed and the switching rotational speed "Ntec" are set according to the method described hereunder using operating conditions when the electric supercharging assistance control is started.

Figure 4:
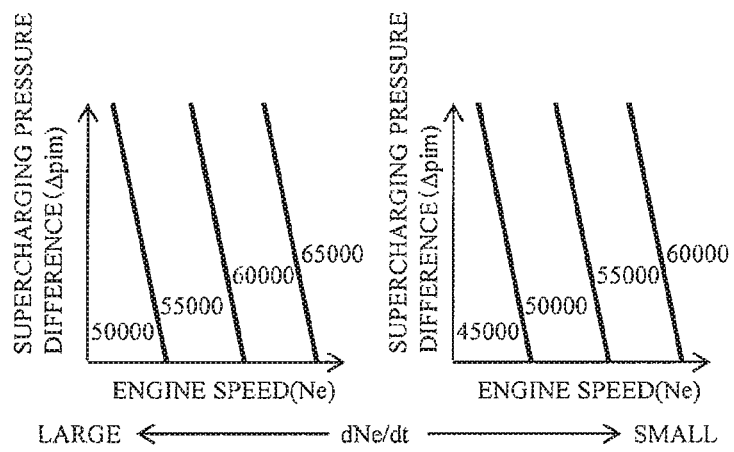
FIG. 4 is a view illustrating an example of a map for determining a switching rotational speed.

The switching rotational speed "Ntec" is determined by means of a three-dimensional map using the engine speed "Ne", the supercharging pressure difference "Δpim" between the actual supercharging pressure and the target supercharging pressure, and a rate of increase in the engine speed "dNe/dt". FIG. 4 is a view illustrating one example of a map for determining the switching rotational speed. In the map shown in FIG. 4, the greater that the engine speed "Ne" is, the greater the value that the switching rotational speed "Ntec" is set to. Because the target supercharging pressure increases as the engine speed increases, it is necessary to also increase the supercharging amount produced by electric supercharging assistance by a corresponding amount. The higher the value that the switching rotational speed "Ntec" is set to, the higher the rotational speed until which the rotational speed rate of increase is maintained at the first rate of increase "Nteup1" will be, and hence the supercharging amount produced by electric supercharging assistance can be increased and the supercharging response can be improved.

Further, from the viewpoint of improving the supercharging response, it is desirable for the supercharging amount produced by electric supercharging assistance to increase as the supercharging pressure difference "Δpim" increases. Therefore, in this map the switching rotational speed "Ntec" is set to a larger value as the supercharging pressure difference "Δpim" increases. By this means, since the rotational speed rate of increase is maintained at the first rate of increase "Nteup1" until a high rotational speed, the supercharging amount produced by the electric supercharging assistance can be rapidly increased and the supercharging response can be improved.

In addition, as the rate of increase in the engine speed "dNe/dt" increases, a tracking characteristic with respect to the target supercharging pressure decreases, because the target supercharging pressure sharply increases. Therefore, in this map, the higher that the rate of increase in the engine speed "dNe/dt" is, the higher the value that the switching rotational speed "Ntec" is set to. By this means, since the supercharging amount that is produced by electric supercharging assistance can be increased as the tracking characteristic with respect to the target supercharging pressure decreases, the supercharging response can be improved.

Figure 5:
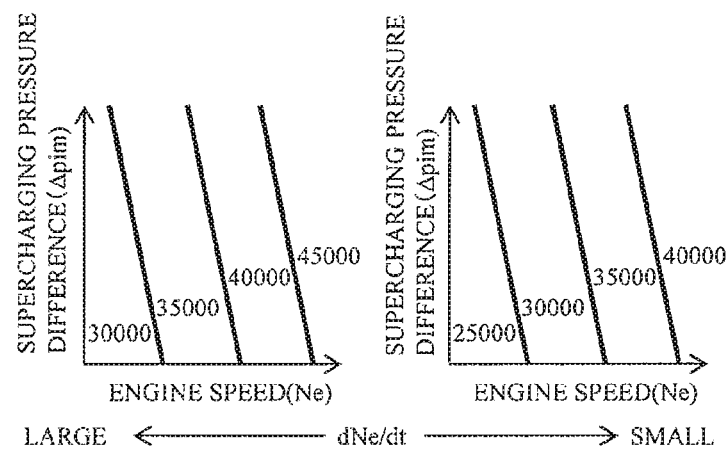
FIG. 5 is a view illustrating an example of a map for determining a second rate of increase "Nteup2" in a rotational speed.
Figure 6A:
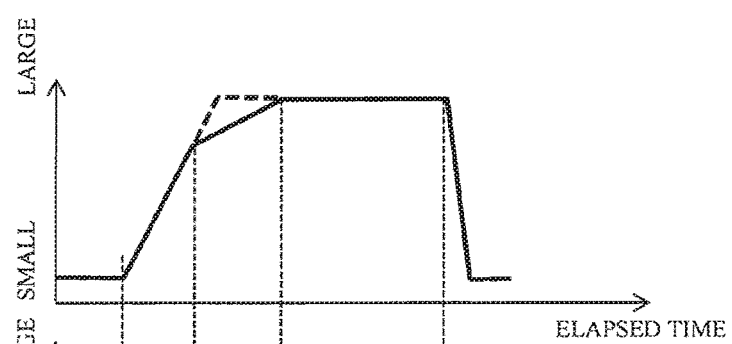
FIG. 6(A) to FIG. 6(E) are views in which changes in various state quantities are compared with respect to a case where a rate of increase in the rotational speed of the electric compressor is reduced during the course of executing electric supercharging assistance and a case where the rate of increase is maintained at a constant rate while executing electric supercharging assistance.
Figure 6B:
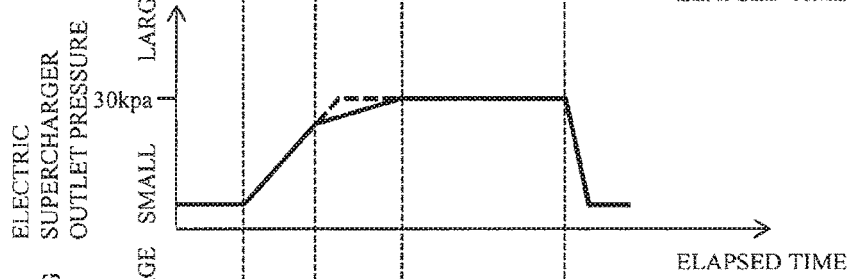
Figure 6C:
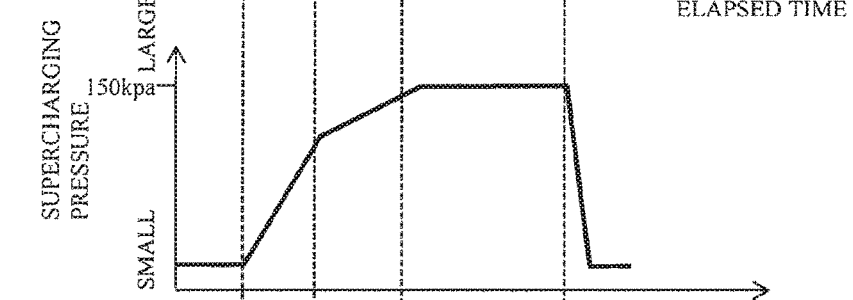
Figure 6D:
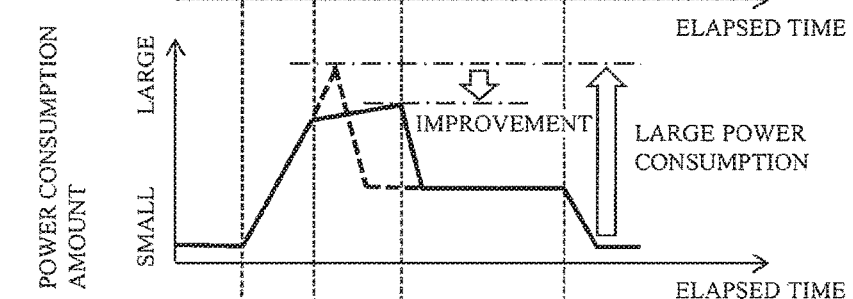
Figure 6E:
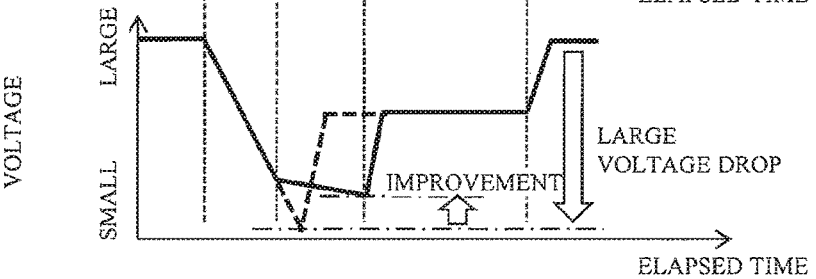

Further, the second rate of increase "Nteup2" is determined by means of a three-dimensional map using the engine speed "Ne", the supercharging pressure difference "Δpim" between the actual supercharging pressure and the target supercharging pressure, and the rate of increase in the engine speed "dNe/dt". FIG. 5 is a view illustrating one example of a map for determining the second rate of increase "Nteup2". In the map illustrated in FIG. 5, the higher that the engine speed "Ne" is, the greater the value to which the second rate of increase "Nteup2" is set. Because the target supercharging pressure increases as the engine speed increases, it is necessary to also increase the supercharging amount produced by electric supercharging assistance by a corresponding amount. The higher that the value is that the second rate of increase "Nteup2" in the rotational speed is set to, the greater the amount by which the supercharging amount produced by electric supercharging assistance will increase after reaching the switching rotational speed "Ntec", and thus the supercharging response can be further improved.

Further, from the viewpoint of improving the supercharging response, it is desirable that the supercharging amount produced by electric supercharging assistance increases as the supercharging pressure difference "Δpim" increases. Therefore, according to this map, the second rate of increase "Nteup2" is set to a larger value as the supercharging pressure difference "Δpim" increases. By this means, the supercharging amount produced by electric supercharging assistance after reaching the switching rotational speed "Ntec" can be increased to further improve the supercharging response.

In addition, as the rate of increase in the engine speed "dNe/dt" increases, a tracking characteristic with respect to the target supercharging pressure decreases, because the target supercharging pressure sharply increases. Therefore, in this map, the higher that the rate of increase in the engine speed "dNe/dt" is, the higher the value that the second rate of increase "Nteup2" is set to. By this means, since the supercharging amount that is produced by electric supercharging assistance can be increased as the tracking characteristic with respect to the target supercharging pressure decreases, the supercharging response can be improved.

FIG. 6(A) to FIG. 6(E) are views in which changes in various state quantities are compared with respect to a case where the rate of increase in the rotational speed of the electric compressor 16a is reduced during the course of executing electric supercharging assistance and a case where the rate of increase is maintained at a constant rate while executing electric supercharging assistance. Note that, the state quantities in FIG. 6(A) to FIG. 6(E) are the same as the state quantities in FIG. 2(A) to FIG. 2(E). Further, in FIG. 6(A) to FIG. 6(E), the case where the rate of increase in the rotational speed of the electric compressor 16a is reduced during the course of executing electric supercharging assistance is indicated by a solid line, and the case where the rate of increase in the rotational speed of the electric compressor 16a is maintained at a constant rate is indicated by a broken line.

As shown in FIG. 6(A) to FIG. 6(E), when the rate of increase in the rotational speed of the electric compressor 16a is reduced during the course of executing electric supercharging assistance, in comparison to the case where the rate of increase is maintained at a constant rate, the rate of increase in the amount of electric power consumption as well as a voltage drop amount can be reduced. Further, during this period, because the influence of supercharging by the turbo-compressor 22a is large, even if the rate of increase in the rotational speed of the electric compressor 16a is reduced, the effect thereof on the supercharging pressure is relatively small. Thus, according to the electric supercharging assistance of the present embodiment, during a period in which the influence of electric supercharging assistance is limited with respect to increasing the supercharging pressure, because the rate of increase in the rotational speed of the electric compressor 16a can be reduced, both an improvement in supercharging response and suppression of electric power consumption can be achieved in a compatible manner.

[Specific Processing in First Embodiment]

Figure 7:
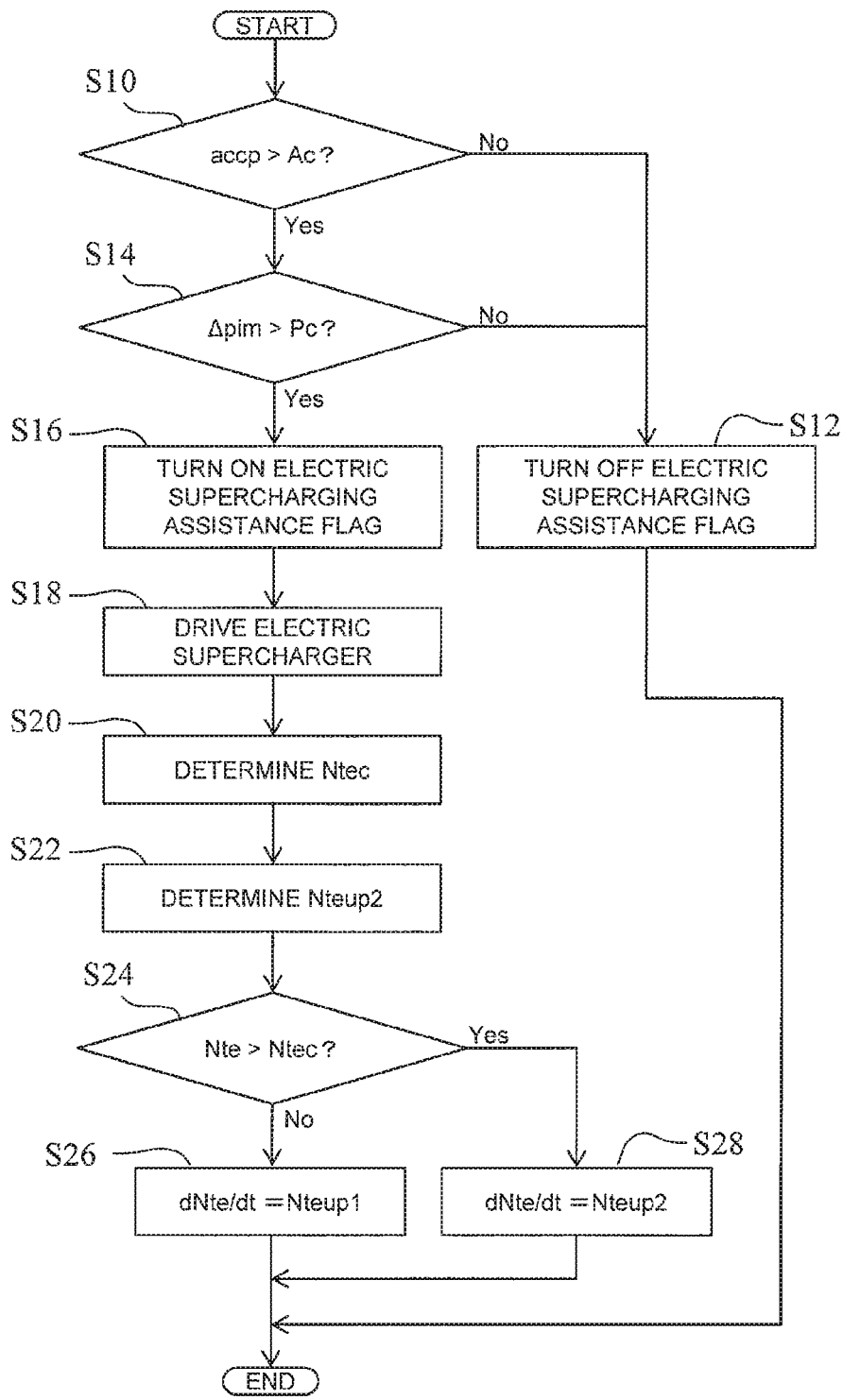
FIG. 7 is a flowchart illustrating a routine for electric supercharging assistance control that is executed by an ECU of the first embodiment of the present invention.

Next, specific processing for the above described electric supercharging assistance will be described in detail using a flowchart. FIG. 7 is a flowchart illustrating a routine for electric supercharging assistance control that is executed by the ECU 30 of the first embodiment of the present invention.

In step S10 in the routine shown in FIG. 7, it is determined whether or not the accelerator degree of opening "accp" that is measured based on a signal from the accelerator degree of opening sensor 38 is greater than a determination accelerator degree of opening "Ac". The determination accelerator degree of opening "Ac" is a threshold value for determining that a torque increase request is issued for which electric supercharging assistance utilizing the electric supercharger 16 is required. A previously set value is read in as the determination accelerator degree of opening "Ac". If it is determined as a result that the relation accp>Ac is not established, it is determined that the supercharging response can be secured even without performing electric supercharging assistance utilizing the electric supercharger 16, and the operation moves to the next step S12. In this step S12, an electric supercharging assistance flag is turned "off". When the electric supercharging assistance flag is turned "off", specifically, passage of a current to the electric motor 16b is stopped and the intake bypass valve 20 is fully opened. After executing the processing in step S12, the present routine is swiftly ended.

In contrast, if it is determined in the aforementioned step S10 that the relation accp>Ac is established, it is determined that there is a possibility that the supercharging response cannot be secured without performing electric supercharging assistance utilizing the electric supercharger 16, and the operation moves to the next step S14. In step S14, it is determined whether or not the supercharging pressure difference "Δpim" is greater than a determination supercharging pressure difference "Pc". The determination supercharging pressure difference "Pc" is a supercharging difference corresponding to a torque increase request for which electric supercharging assistance is required. A previously set value is read in as the determination supercharging pressure difference "Pc". If it is determined as a result that the relation Δpim>Pc is not established, it is determined that the supercharging response can be secured even without performing electric supercharging assistance utilizing the electric supercharger 16, and the operation moves to step S12. In step S12, the electric supercharging assistance flag is turned "off", and thereafter the present routine is swiftly ended.

On the other hand, in the aforementioned step S14, if it is determined that the relation Δpim>Pc is established, it is determined that electric supercharging assistance control utilizing the electric supercharger 16 is required. The operation then moves to the next step S16. In step S16, the electric supercharging assistance flag is turned "on". When the electric supercharging assistance flag is turned "on", the operation then moves to the next step S18, in which the electric supercharger 16 is driven in a state in which the intake bypass valve 20 is fully closed. In this case, specifically, a current is supplied to the electric motor 16b as to realize a rotational speed rate of increase "dNte/dt" that is currently set. Note that the initial value of the rotational speed rate of increase "dNte/dt" is set to the first rate of increase "Nteup1" that is described later.

Next, in step S20, the switching rotational speed "Ntec" is determined. In this case, more specifically, the engine speed "Ne", the supercharging pressure difference "Δpim" between the actual supercharging pressure and the target supercharging pressure, and the rate of increase in the engine speed "dNe/dt" are read in as actually measured values, and a switching rotational speed "Ntec" corresponding to the actually measured values is determined based on the above described three-dimensional map that uses the engine speed "Ne", the supercharging pressure difference "Δpim" between the actual supercharging pressure and the target supercharging pressure, and the rate of increase in the engine speed "dNe/dt".

Next, in step S22, the second rate of increase "Nteup2" is determined. In this case, more specifically, the engine speed "Ne", the supercharging pressure difference "Δpim" between the actual supercharging pressure and the target supercharging pressure, and the rate of increase in the engine speed "dNe/dt" are read in as actually measured values, and a second rate of increase "Nteup2" corresponding to the actually measured values is determined based on the above described three-dimensional map that uses the engine speed "Ne", the supercharging pressure difference "Δpim" between the actual supercharging pressure and the target supercharging pressure, and the rate of increase in the engine speed "dNe/dt".

Next, in step S24, it is determined whether or not the rotational speed "Nte" of the electric compressor 16a that is measured by the rotational speed sensor 32 is greater than the switching rotational speed "Ntec" determined in the aforementioned step S20. If it is determined as a result that the relation Nte>Ntec is not established, since the rotational speed "Nte" has not reached the switching rotational speed "Ntec" the operation moves to the next step S26. In step S26, the rotational speed rate of increase "dNte/dt" of the electric compressor 16a is set to the first rate of increase "Nteup1". For the first rate of increase "Nteup1", as a previously determined value, for example, a maximum rate of increase in the rotational speed is used.

On the other hand, if it is determined in the aforementioned step S24 that the relation Nte>Ntec is established, since the rotational speed "Nte" has reached the switching rotational speed "Ntec", the operation moves to step S28. In step S28, the rotational speed rate of increase "dNte/dt" of the electric compressor 16a is set to the second rate of increase "Nteup2".

By performing electric supercharging assistance control according to the above described routine, it is possible to suppress electric power consumption without a significant loss in the supercharging response.

Note that the present invention is not limited to the above described embodiment, and various modifications can be made without departing from the spirit and scope of the present invention. For example, the modifications described hereunder may be made.

Figure 8:
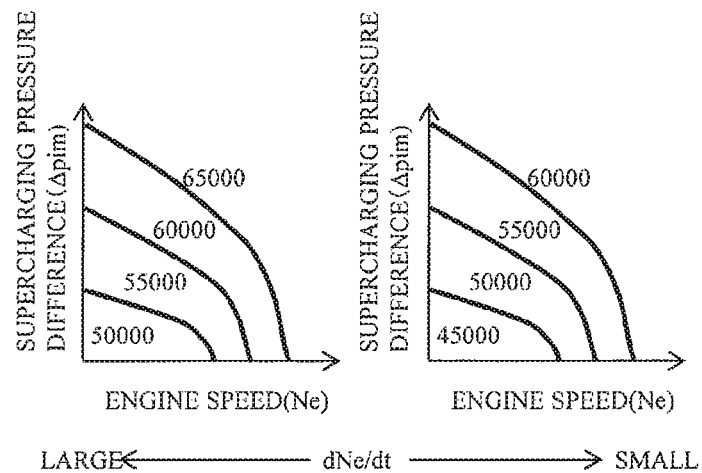
FIG. 8 is a view illustrating another example of a map for determining a switching rotational speed.
Figure 9:
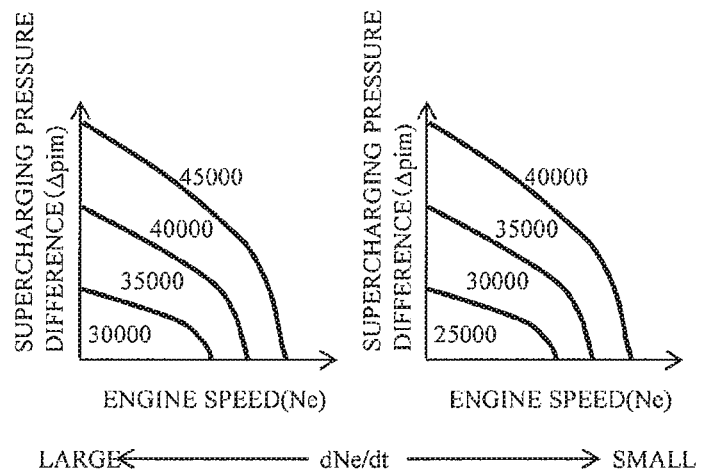
FIG. 9 is a view illustrating another example of a map for determining the second rate of increase "Nteup2" in the rotational speed.

In the above described first embodiment a configuration is adopted in which the switching rotational speed "Ntec" and the second rate of increase "Nteup2" are set using the maps shown in FIG. 4 and FIG. 5. However, maps that can be used to set these values are not limited to the maps shown in FIG. 4 and FIG. 5, and for example the maps described hereunder may also be used. FIG. 8 is a view illustrating another example of a map for determining the switching rotational speed. FIG. 9 is a view illustrating another example of a map for determining the second rate of increase "Nteup2" in the rotational speed. The maps shown in FIG. 8 and FIG. 9 are maps that reflect a fact that a greater supercharging response is required as the engine speed increases. According to the maps shown in FIG. 8 and FIG. 9, the switching rotational speed "Ntec" and the second rate of increase "Nteup2" are set to larger values with respect to the engine speed compared to the maps shown in FIG. 4 and FIG. 5, and hence the supercharging pressure response with respect to the target supercharging pressure can be further enhanced.

Further, in the above described first embodiment a configuration is adopted in which the switching rotational speed "Ntec" is set using a three-dimensional map that uses the engine speed "Ne", the supercharging pressure difference "Δpim" between the actual supercharging pressure and the target supercharging pressure, and the rate of increase in the engine speed "dNe/dt". However, a map that can be used for setting the switching rotational speed "Ntec" is not limited thereto, and another map may be used as long as the map defines a relation between the switching rotational speed "Ntec" and at least any one of the engine speed "Ne", the supercharging pressure difference "Δpim" between the actual supercharging pressure and the target supercharging pressure, and the rate of increase in the engine speed "dNe/dt". Further, likewise with respect to a map for setting the second rate of increase "Nteup2" also, another map may be used as long as the map defines a relation between the second rate of increase "Nteup2" and at least any one of the engine speed "Ne", the supercharging pressure difference "Δpim" between the actual supercharging pressure and the target supercharging pressure, and the rate of increase in the engine speed "dNe/dt".

Although in the above described first embodiment a configuration is adopted in which the rotational speed "Nte" of the electric compressor 16a is measured by the rotational speed sensor 32, a configuration may also be adopted in which the electric motor 16b or the ECU 30 has a function for detecting the rotational speed "Nte".

Further, although in the above described first embodiment the present system is described as a system that can be applied to a diesel engine with a turbocharger, the present system may also be applied to a spark-ignition internal combustion engine. This similarly applies to the second embodiment that is described later.

In the above described first embodiment a configuration is described in which the turbo-compressor 22a of the turbocharger 22 is arranged in the intake passage 10 on the intake-air downstream side relative to the electric compressor 16a of the electric supercharger 16. However, the arrangement of the electric supercharger 16 and the turbocharger 22 is not limited thereto. For example, a configuration may be adopted in which the electric compressor 16a of the electric supercharger 16 is arranged in the intake passage 10 on the intake-air downstream side relative to the turbo-compressor 22a of the turbocharger 22, or a configuration may be adopted in which the electric supercharger 16 and the turbocharger 22 are arranged in parallel in the intake passage 10. This similarly applies to the second embodiment that is described later.

Note that, in the above described first embodiment, the turbine 22b corresponds to "turbine" of the aforementioned first invention, the turbo-compressor 22a corresponds to "compressor" of the first invention, the turbocharger 22 corresponds to "turbocharger" of the first invention, the electric supercharger 16 corresponds to "electric supercharger" of the first invention, the rotational speed of the electric compressor 16a corresponds to "rotational speed of an electric supercharger" of the first invention, the switching rotational speed "Ntec" corresponds to "switching rotational speed" of the first invention, the first rate of increase "Nteup1" corresponds to "first rate of increase" of the first invention, the second rate of increase "Nteup2" corresponds to "second rate of increase" of the first invention, and the ECU 30 corresponds to "control device" of the first invention.

Second Embodiment

Next, a second embodiment of the present invention will be described. The second embodiment of the present invention can be realized by using the hardware configuration illustrated in FIG. 1, and causing the ECU 30 to execute a routine shown in FIG. 10 that is described later.

[Feature of Second Embodiment]

In the control device of the first embodiment that is described above, a configuration is adopted in which, in the electric supercharging assistance control, when the rotational speed of the electric compressor 16a arrives at the switching rotational speed "Ntec", the rotational speed rate of increase is decreased from the first rate of increase "Nteup1" to the second rate of increase "Nteup2". By this means, a voltage drop amount of the electric power storage apparatus 40 can be reduced, and hence the occurrence of a situation in which the voltage of the electric power storage apparatus 40 drops below a lower limit can be suppressed.

However, in some cases, even if the rate of increase in the rotational speed of the electric compressor 16a is the same, the amount of electric power consumption changes depending on the characteristics of the electric power storage apparatus 40 or deterioration of a cable or the like. Therefore, even if the switching rotational speed "Ntec" and the second rate of increase "Nteup2" are used that are set using a three-dimensional map that uses the engine speed "Ne", the supercharging pressure difference "Δpim" between the actual supercharging pressure and the target supercharging pressure, and the rate of increase in the engine speed "dNe/dt", depending on the circumstances there is a risk that the amount of electric power consumption will be larger than an assumed amount, and consequently the voltage of the electric power storage apparatus 40 will drop to an amount that is below a lower limit.

Therefore, according to the control device of the present second embodiment a configuration is adopted in which a voltage drop rate ΔV is calculated based on an actually measured voltage value of the electric power storage apparatus 40 during electric supercharging assistance control, and the switching rotational speed "Ntec" and the second rate of increase "Nteup2" that are set using the three-dimensional map are corrected based on the voltage drop rate. More specifically, for example, the relation between a rate of increase in the rotational speed of the electric compressor 16a and an estimated value of the voltage drop rate ΔV is stored in advance in the ECU 30, and an estimated value of the voltage drop rate ΔV corresponding to the first rate of increase "Nteup1" that is set using the three-dimensional map is read in. If the measured voltage drop rate ΔV is greater than the estimated value, it is determined that there is a risk that a future voltage value will be less than a predetermined lower limit value, and therefore the switching rotational speed "Ntec" and the second rate of increase "Nteup2" that are determined by means of the three-dimensional map are corrected to smaller values. According to such control, even in a case where the amount of electric power consumption during electric supercharging assistance control is larger than an assumed amount, it is possible to compensate for the minimum voltage of the electric power storage apparatus 40.

[Specific Processing in Second Embodiment]

Figure 10:
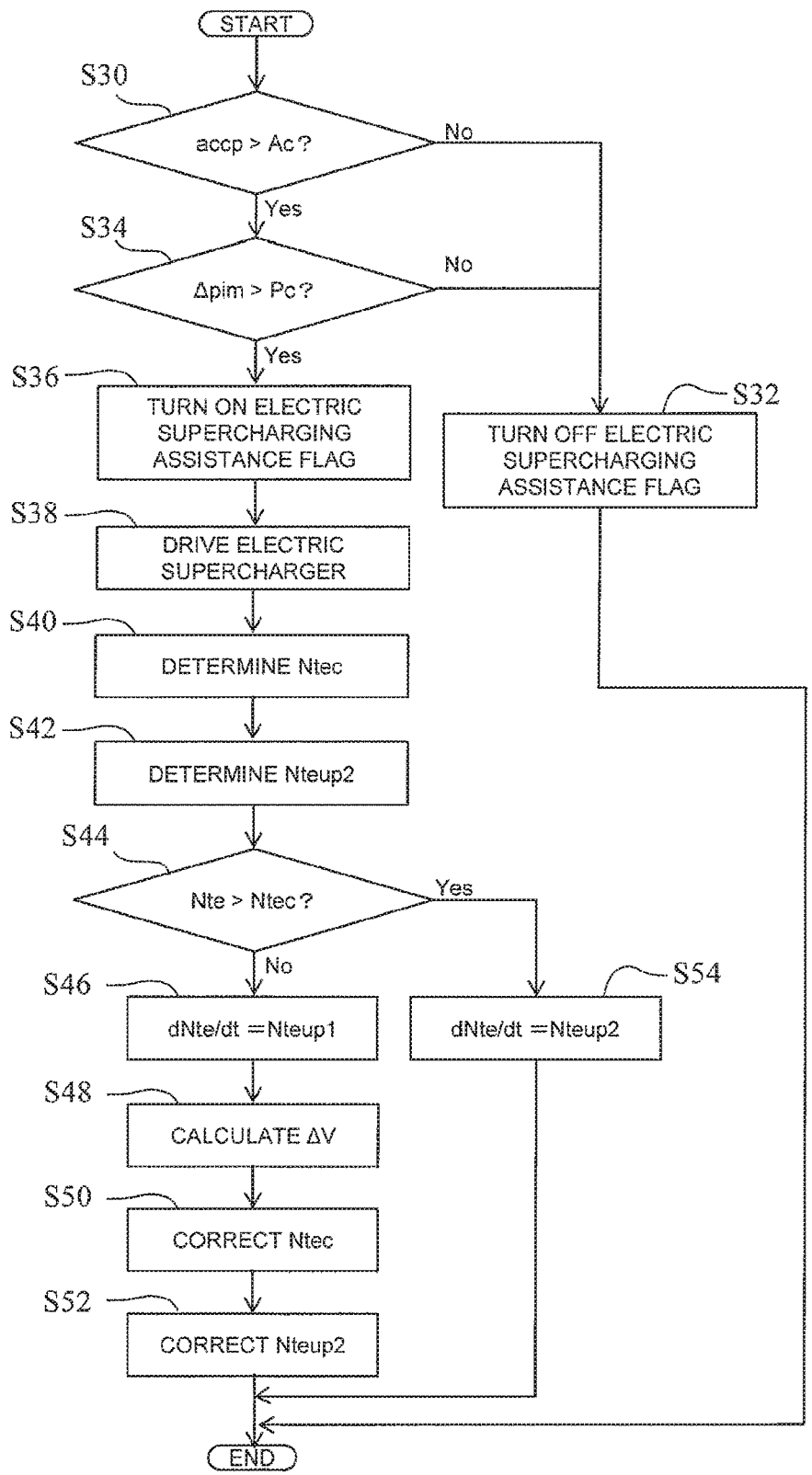
FIG. 10 is a flowchart illustrating a routine for electric supercharging assistance control that is executed by an ECU of a second embodiment of the present invention.
Figure 11A:
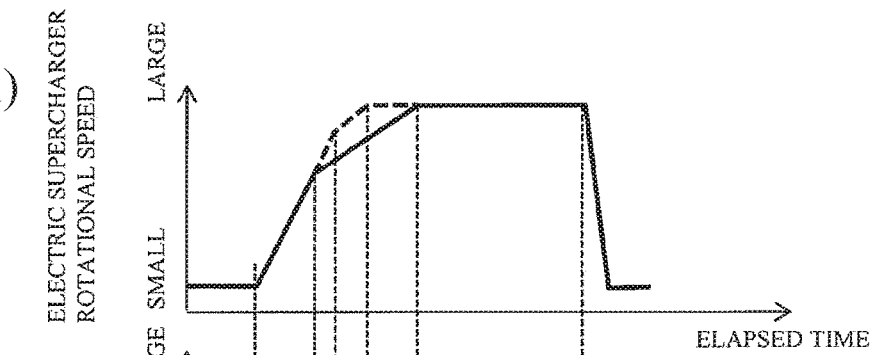
FIG. 11(A) to FIG. 11(E) are views in which changes in various state quantities are compared with respect to a case where, in the course of executing electric supercharging assistance, a rate of increase in the rotational speed of the electric compressor is changed using a voltage drop rate, and a case where, in the course of executing electric supercharging assistance, a rate of increase in the rotational speed of the electric compressor is changed without using a voltage drop rate.
Figure 11B:
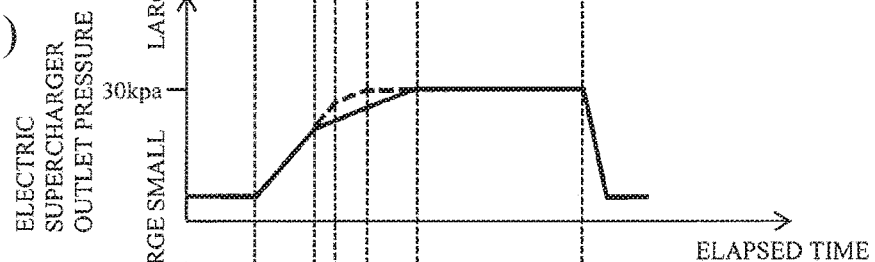
Figure 11C:
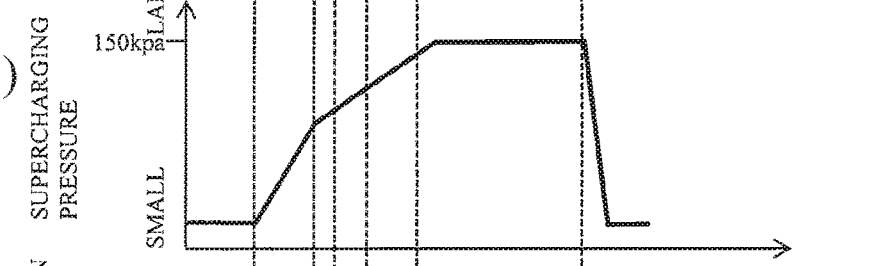
Figure 11D:
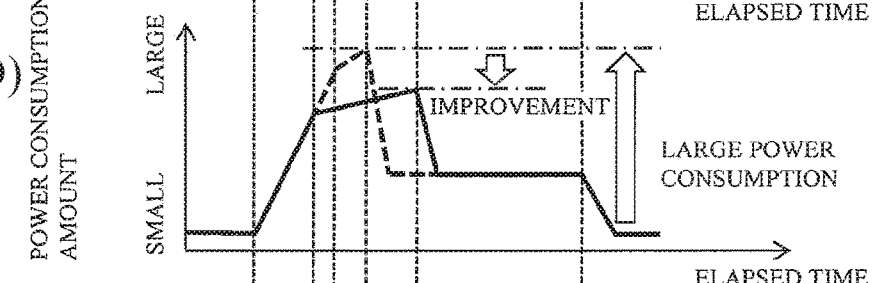
Figure 11E:
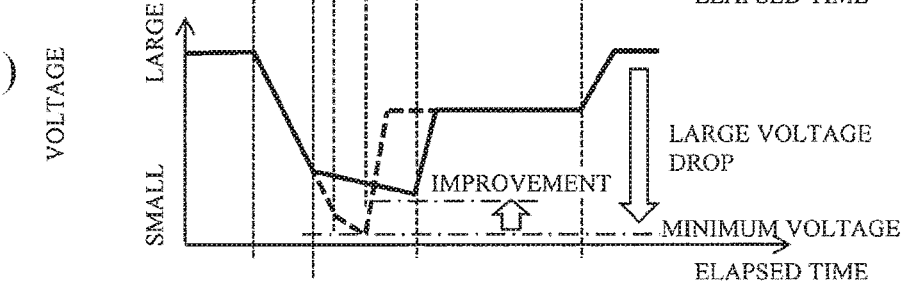

FIG. 10 is a flowchart illustrating a routine for electric supercharging assistance control that is executed by the ECU 30 of a second embodiment of the present invention.

The processing executed in step S30 to step S46 in the routine illustrated in FIG. 10 is the same as the processing executed in step S10 to step S26 in the routine illustrated in FIG. 7 that is described above. Upon performing the processing in step S46, the operation moves to the next step S48. In step S48, the voltage drop rate ΔV is calculated based on an actually measured voltage value of the electric power storage apparatus 40.

Next, in step S50, the switching rotational speed "Ntec" is corrected based on the voltage drop rate ΔV, and in the subsequent step S52, the second rate of increase "Nteup2" of the rotational speed is also corrected based on the voltage drop rate ΔV. In these steps, specifically, an estimated value of the voltage drop rate ΔV that corresponds to the first rate of increase "Nteup1" that is set in the aforementioned step S46 is read in from a map. If the voltage drop rate ΔV calculated in the aforementioned step S48 is greater than the estimated value of the voltage drop rate ΔV, the switching rotational speed "Ntec" and the second rate of increase "Nteup2" that are determined by means of the three-dimensional maps in the aforementioned steps S40 and S42 are corrected to smaller values.

Thus, if it is determined in step S44 that the relation Nte>Ntec is not established, the processing from step S46 to step S52 is executed, and thereafter the present routine is ended. In contrast, if it is determined in step S44 that the relation Nte>Ntec is established, the operation moves to step S54. In step S54, processing that is the same as in step S28 that is described above is executed and the present routine is then ended.

By performing electric supercharging assistance control in accordance with the above described routine, even in a case where an excessive voltage drops occurs, it is possible to ensure that the voltage of the electric power storage apparatus does not fall below a predetermined lower limit value without a significant loss in the supercharging response.

FIG. 11(A) to FIG. 11(E) are views in which changes in various state quantities are compared with respect to a case where a rate of increase in the rotational speed of the electric compressor 16a is changed using the voltage drop rate ΔV in the course of executing electric supercharging assistance, and a case where the rate of increase in the rotational speed of the electric compressor 16a is changed without using the voltage drop rate ΔV in the course of executing electric supercharging assistance. Note that, the state quantities shown in FIG. 11(A) to FIG. 11(E) are the same as the state quantities shown in FIG. 2(A) to FIG. 2 (E). Further, in FIG. 11(A) to FIG. 11(E), an example of a case where the rate of increase in the rotational speed of the electric compressor 16a is changed using the voltage drop rate ΔV is indicated by a solid line, and an example of a case where the rate of increase in the rotational speed of the electric compressor 16a is changed without using the voltage drop rate ΔV is indicated by a broken line.

As shown by a broken line in FIG. 11(A) to FIG. 11(E), when the rate of increase in the rotational speed of the electric compressor 16a is changed to a smaller value without using the voltage drop rate ΔV in the course of increasing the rotational speed, there is a risk that the voltage will drop by a large amount in a case where the voltage drop rate ΔV drops sharply or the like and will fall below a predetermined minimum voltage. In contrast, as shown by a solid line in FIG. 11(A) to FIG. 11(E), when the switching rotational speed and the rotational speed rate of increase are determined based on the voltage drop rate ΔV, even in a case where the voltage drop rate ΔV drops sharply, it is possible to effectively suppress the occurrence of a situation in which the voltage of the electric power storage apparatus 40 falls below a predetermined minimum voltage.

Note that the present invention is not limited to the above described second embodiment, and various modifications can be made without departing from the spirit and scope of the present invention. For example, the modifications described hereunder may be made.

In the above described second embodiment a configuration is adopted in which the switching rotational speed "Ntec" and the second rate of increase "Nteup2 that are set using three-dimensional maps are corrected using the voltage drop rate ΔV. However, a method for determining the switching rotational speed "Ntec" and the second rate of increase "Nteup2" using the voltage drop rate ΔV is not limited to the aforementioned method. That is, another method may also be used as long as the method is one in which a voltage drop rate ΔV that is actually measured during electric supercharging assistance control is reflected in the determination of the switching rotational speed "Ntec" and the second rate of increase "Nteup2", and that ensures that the voltage of the electric power storage apparatus 40 does not become less than a minimum voltage during electric supercharging assistance control. For example, a future voltage of the electric power storage apparatus 40 may be predicted based on a voltage drop rate ΔV that is actually measured, and the switching rotational speed "Ntec" and the second rate of increase "Nteup2" may be determined so that the predicted value does not become less than the minimum voltage. Further, the objects of correction based on the voltage drop rate ΔV are not limited to both of the switching rotational speed "Ntec" and the second rate of increase "Nteup2", and a configuration may also be adopted in which either one thereof is corrected to ensure that the voltage of the electric power storage apparatus 40 does not fall below a minimum voltage.

Note that, in the above described second embodiment, the turbine 22b corresponds to "turbine" of the aforementioned first invention, the turbo-compressor 22a corresponds to "compressor" of the first invention, the turbocharger 22 corresponds to "turbocharger" of the first invention, the electric supercharger 16 corresponds to "electric supercharger" of the first invention, the rotational speed of the electric compressor 16a corresponds to "rotational speed of an electric supercharger" of the first invention, the switching rotational speed "Ntec" corresponds to "switching rotational speed" of the first invention, the first rate of increase "Nteup1 " corresponds to "first rate of increase" of the first invention, the second rate of increase "Nteup2" corresponds to "second rate of increase" of the first invention, and the ECU 30 corresponds to "control device" of the first invention.

Further, in the above described second embodiment, the voltmeter 42 corresponds to "voltage measurement apparatus" of the aforementioned eighth invention.

The invention claimed is:

1. An internal combustion engine system for controlling an internal combustion engine comprising a control device, a turbocharger having a turbine that is arranged in an exhaust passage and a compressor that is arranged in an intake passage, and an electric supercharger that is provided in the intake passage,
   the control device configured to receive and process signals input from a plurality of sensors located at various locations in the internal combustion engine system, the control device processes the signals input from the various sensors and actuates various actuators located in the internal combustion system in accordance with a predetermined control program to perform overall control of the internal combustion system, and wherein the plurality of sensors including at least one speed sensor to detect an engine speed of the internal combustion engine,
   the control device configured to:
   increase a rotational speed of the electric supercharger at a first rate of increase upon receipt of a torque increase request with respect to the internal combustion engine;
   during a process in which a rotational speed of the electric supercharger is increasing, and when the rotational speed arrives at a predetermined switching rotational speed, change a rate of increase in the rotational speed from the first rate of increase to a second rate of increase that is less than the first rate of increase; and
   set the switching rotational speed based on at least any one of an engine speed of the internal combustion engine detected by the at least one engine speed sensor, a rate of increase in the engine speed, and a supercharging pressure difference between a target supercharging pressure and an actual supercharging pressure, and to also set the second rate of increase based on at least any one of the engine speed of the internal combustion engine, the rate of increase in the engine speed, and a supercharging pressure difference between a target supercharging pressure and an actual supercharging pressure.

2. The internal combustion engine system according to claim 1, wherein the control device is configured to set the switching rotational speed to a larger value as the engine speed increases.

3. The internal combustion engine system according to claim 1, wherein the control device is configured to set the second rate of increase to a larger value as the engine speed increases.

4. The internal combustion engine system according to claim 1, wherein the control device is configured to set the switching rotational speed to a larger value as the rate of increase in the engine speed increases.

5. The internal combustion engine system according to claim 1, wherein the control device is configured to set the second rate of increase to a larger value as the rate of increase in the engine speed increases.

6. The internal combustion engine system according to claim 1, wherein the control device is configured to set the switching rotational speed to a larger value as the supercharging pressure difference increases.

7. The internal combustion engine system according to claim 1, wherein the control device is configured to set the second rate of increase to a larger value as the supercharging pressure difference increases.

8. The internal combustion engine system according to claim 1 according to claim 1, comprising:
  a voltmeter that measures a voltage of an electric power storage apparatus of the internal combustion engine;
  wherein the control device is configured to calculate a voltage drop rate during a process in which a rotational speed of the electric supercharger is increasing, by using a voltage value that is measured by the voltmeter, and to set the switching rotational speed and the second rate of increase so that a future voltage that is estimated based on the voltage drop rate does not become less than a predetermined minimum voltage.

* * * * *